US008829351B2

(12) United States Patent
Kogo

(10) Patent No.: US 8,829,351 B2
(45) Date of Patent: Sep. 9, 2014

(54) ELECTRIC WIRE FOR AUTOMOBILE

(75) Inventor: Kousuke Kogo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 258 days.

(21) Appl. No.: 13/521,513

(22) PCT Filed: Apr. 27, 2011

(86) PCT No.: PCT/JP2011/060692
§ 371 (c)(1),
(2), (4) Date: Jul. 11, 2012

(87) PCT Pub. No.: WO2011/136388
PCT Pub. Date: Nov. 3, 2011

(65) Prior Publication Data
US 2012/0279751 A1 Nov. 8, 2012

(30) Foreign Application Priority Data

Apr. 27, 2010 (JP) ................................. 2010-102035

(51) Int. Cl.
| | | |
|---|---|---|
| H01B 7/00 | (2006.01) | |
| H01B 3/18 | (2006.01) | |
| C08K 3/16 | (2006.01) | |
| H01B 7/29 | (2006.01) | |
| C08K 3/20 | (2006.01) | |
| C08L 23/10 | (2006.01) | |
| C08L 23/12 | (2006.01) | |
| H01B 3/44 | (2006.01) | |
| C08K 3/00 | (2006.01) | |
| H01B 7/295 | (2006.01) | |

(52) U.S. Cl.
CPC .................. *H01B 7/295* (2013.01); *H01B 3/18* (2013.01); *C08L 2201/02* (2013.01); *C08K 3/16* (2013.01); *H01B 7/29* (2013.01); *C08K 3/20* (2013.01); *C08L 23/10* (2013.01); *C08L 23/12* (2013.01); *H01B 3/44* (2013.01); *C08K 3/0058* (2013.01)
USPC ...................................................... 174/110 R

(58) Field of Classification Search
CPC .............. H01B 1/00; H01B 3/00; H01B 5/00; H01B 7/00; H01B 9/00; H01B 11/00; H01B 12/00; H01B 15/00; H01B 17/00; H01B 19/00; H08F 2/00; H08F 10/00; H08F 110/00; H08F 210/00; H08F 251/00; H08F 293/00
USPC .... 174/110 R–110 PM, 120 R, 102 R, 105 R, 174/106 R, 120 SR
See application file for complete search history.

(56) References Cited

U.S. PATENT DOCUMENTS

| | | | |
|---|---|---|---|
| 2002/0099141 A1 | 7/2002 | Sato et al. | |
| 2008/0142527 A1* | 6/2008 | Rael | ........................... 220/573.1 |
| 2008/0227905 A1* | 9/2008 | Kumasaki et al. | ............ 524/505 |
| 2009/0142527 A1 | 6/2009 | Kagawa | |
| 2010/0300727 A1* | 12/2010 | Sultan et al. | ............. 174/113 R |
| 2012/0279753 A1 | 11/2012 | Kambe et al. | |

FOREIGN PATENT DOCUMENTS

| | | |
|---|---|---|
| CN | 101323689 A | 12/2008 |
| CN | 102782774 A | 11/2012 |
| EP | 1198499 A | 7/2001 |
| EP | 1213322 A1 | 6/2002 |
| EP | 1221463 A1 | 7/2002 |
| JP | 2007-246726 A | 9/2007 |
| JP | 2008239901 A | 10/2008 |
| JP | 2009040947 A | 2/2009 |
| WO | 0151554 A1 | 7/2001 |

OTHER PUBLICATIONS

International Search Report dated Oct. 13, 2011 issued in International Application No. PCT/JP2011/060692 (PCT/ISA/210).
Written Opinion dated Oct. 13, 2011 issued in International Application No. PCT/JP2011/060692 (PCT/ISA/237).
Office Action dated Mar. 7, 2014 issued by the State Intellectual Property Office of the People's Republic of China in counterpart Chinese Patent Application No. 201180021485.7.

* cited by examiner

*Primary Examiner* — William H Mayo, III
(74) *Attorney, Agent, or Firm* — Sughrue Mion, PLLC

(57) ABSTRACT

The present invention provides an electric wire for an automobile. Specifically, the present invention provides an electric wire for an automobile coated with a composition comprising (A) 100 parts by weight of a mixture of 1 to 30 parts by weight of a maleic acid-modified polypropylene resin and a polyolefin-based resin other than the maleic acid-modified polypropylene resin, (B) 10 to 80 parts by weight of a halogen-based flame retardant, and (C) 5 to 45 parts by weight of a metal hydrate flame retardant.

6 Claims, No Drawings

1

ELECTRIC WIRE FOR AUTOMOBILE

CROSS REFERENCE TO RELATED APPLICATION

This application is a continuation of PCT application No. PCT/JP2011/060692, which was filed on Apr. 27, 2011 based on Japanese Patent Application (No. 2010-102035) filed on Apr. 27, 2010, the contents of which are incorporated herein by reference. Also, all the references cited herein are incorporated as a whole.

BACKGROUND OF THE INVENTION

1. Technical Field

The present invention relates to an electric wire for an automobile. More specifically, the invention relates to an electric wire for an automobile having both a good battery fluid resistance and a good coating strippability by coating with a composition comprising a combination of a prescribed amount of a metal hydrate, a halogen-based flame retardant, and a modified polypropylene resin.

2. Background Art

In order to make an insulating resin composition for coating an electric wire for an automobile halogen-free, a composition comprising a polypropylene-based resin as a base polymer and a metal hydrate such as magnesium hydroxide is used. However, the non-halogen flame retardant resin composition has a problem in mechanical properties since the composition comprises a large amount of the metal hydrate.

As a flame retardant resin composition having various properties such as mechanical properties, heat resistance, and cold resistance in a balanced manner, a resin composition comprising (a) a polypropylene-based resin, (b) an ethylene-vinyl acetate copolymer, (c) a styrene-based thermoplastic elastomer, (d) a modified polyolefin, and (e) magnesium hydroxide was proposed (JP-A-2008-239901).

Moreover, in order to improve mechanical properties, use of a polyamide resin is proposed. However, it causes a problem that high molding temperature is required. In order to solve the problem, a resin composition comprising a polyamide 6/66 copolymer as a polyamide resin was proposed (JP-A-2009-40947).

SUMMARY OF INVENTION

However, it was found that these resin compositions could not meet battery fluid resistance in accordance with ISO6722 (the 2006 edition). Accordingly, an object of the invention is to provide an electric wire for an automobile which is coated with a flame retardant insulating resin composition, and has excellent battery fluid resistance.

As a result of various investigations for achieving the above object, it was that the metal hydrate makes battery fluid resistance worse. However, when the amount of the metal hydrate is reduced, flame retardancy deteriorates. Furthermore, it was also found that the decrease in the metal hydrate makes coating strippability worse, wherein the coating strippability is a property that an insulation layer is easily torn at the time of peeling an end part of the insulation coating layer for connecting an electric wire to a metal terminal. Accordingly, as a result of various investigations, it was found that a composition which satisfies the above properties is obtained by using a halogen-based flame retardant instead of reduction of the amount of the metal hydrate and further using a prescribed amount of a maleic acid-modified polypropylene resin.

Namely, the invention relates to the following (1) to (11):

(1) An electric wire for an automobile coated with a composition comprising (A) 100 parts by weight of a mixture of 1 to 30 parts by weight of a maleic acid-modified polypropylene resin and a polyolefin-based resin other than the maleic acid-modified polypropylene resin, (B) 10 to 80 parts by weight of a halogen-based flame retardant, and (C) 5 to 45 parts by weight of a metal hydrate flame retardant;

(2) The electric wire described in the above (1), wherein the maleic acid-modified polypropylene resin is a polypropylene obtained by graft polymerization of maleic anhydride onto polypropylene;

(3) The electric wire described in the above (1), wherein a mixing amount of the maleic acid-modified polypropylene resin is 5 to 10 parts by weight;

(4) The electric wire described in the above (1), wherein the polyolefin-based resin other than the maleic acid-modified polypropylene resin is at least one compound selected from a polypropylene-based resin other than the maleic acid-modified polypropylene-based resin, an olefin-based thermoplastic elastomer, and a styrene-based thermoplastic elastomer;

(5) The electric wire described in the above (4), wherein the polypropylene-based resin other than the maleic acid-modified polypropylene-based resin is at least one compound selected from a polypropylene homopolymer and a copolymer of propylene with a monomer copolymerizable with propylene;

(6) The electric wire described in the above (4), wherein the olefin-based thermoplastic elastomer is a mixture of a crystalline polyolefin and amorphous olefin-based copolymer rubber; a block copolymer of crystalline polyolefin and amorphous rubber; or a copolymer of ethylene/propylene/butane;

(7) The electric wire described in the above (4), wherein the styrene-based thermoplastic elastomer is a block copolymer or random copolymer comprising an aromatic vinylic polymer block and a conjugated diene-based polymer block;

(8) The electric wire described in the above (1), wherein the halogen-based flame retardant is a bromine-based flame retardant or a chlorine-based flame retardant;

(9) The electric wire described in the above (1), wherein the mixing amount of the halogen-based flame retardant is 20 to 50 parts by weight;

(10) The electric wire described in the above (1), wherein the metal hydrate flame retardant is at least one compound selected from magnesium hydroxide, aluminum hydroxide, calcium hydroxide, basic magnesium carbonate, hydrated aluminum silicate, and hydrated magnesium silicate; and

(11) The electric wire described in the above (1), wherein a mixing amount of the metal hydrate flame retardant is 20 to 30 parts by weight.

The above-described electric wire for an automobile of the invention satisfies battery fluid resistance, coating strippability, and flame retardancy in a balanced manner.

DETAILED DESCRIPTION OF THE EXEMPLARY EMBODIMENTS

<(A) Mixture of Polyolefin-Based Resins>

In the composition to be used in the invention, a base resin is a combination of a maleic acid-modified polypropylene resin and a polyolefin-based resin other than the maleic acid-modified polypropylene resin (hereinafter simply referred to as "polyolefin-based resin"). The coating strippability of an electric wire is improved by comprising a prescribed amount of the maleic acid-modified polypropylene resin.

Examples of the maleic acid-modified polypropylene resin include a polypropylene obtained by graft polymerization of maleic anhydride onto polypropylene. The maleic acid-modified polypropylene resin may be produced by either method of a melting method or a solution method. The acid value (JIS K 0070) of the maleic acid-modified polypropylene resin is 15 to 55, preferably 30 to 40. Moreover, the weight-average molecular weight thereof is 15,000 to 50,000, preferably 20,000 to 40,000. The mixing amount of the maleic acid-modified polypropylene resin is 1 to 30 parts by weight, preferably 5 to 10 parts by weight, based on the total amount of the mixture of the polyolefin-based resins. When the content of the maleic acid-modified polypropylene resin is out of the above range, the coating strippability deteriorates.

The polyolefin-based resin other than the above maleic acid-modified polypropylene resin (hereinafter sometimes referred to as "polyolefin-based resin") is preferably at least one compound selected from a polypropylene-based resin other than the maleic acid-modified polypropylene-based resin, an olefin-based thermoplastic elastomer, and a styrene-based thermoplastic elastomer. Examples of the polypropylene-based resins other than the maleic acid-modified polypropylene-based resin include a polypropylene homopolymer and a copolymer of propylene with a monomer copolymerizable with propylene. Examples of the monomer include linear α-olefins such as ethylene, 1-butene, and 1-pentene; and ethylene-based unsaturated carboxylic acids other than maleic acid, such as (meth)acrylic acid and fumaric acid, and acid anhydrides thereof. The monomer may be a combination of two or more monomers of these copolymerizable monomers.

Examples of the olefin-based thermoplastic elastomer include a mixture of a crystalline polyolefin and amorphous olefin-based copolymer rubber; a block copolymer of crystalline polyolefin and amorphous rubber; a copolymer of ethylene/propylene/butene; and the like. Examples of the crystalline polyolefin include homopolymers of ethylene, propylene, butene-1, hexene-1,4-methylpentene-1 and the like; and non-elastomeric copolymers. Examples of the non-elastomeric copolymer include copolymer of ethylene and propylene or at least one of the other α-polyolefin. Examples of the amorphous rubber include ethylene/propylene copolymer rubber (EPM), ethylene/1-butene copolymer rubber (EPM), ethylene/propylene/butene copolymer rubber, ethylene/propylene/nonconjugated diene copolymer rubber (EPDM), and the like.

In addition to the above amorphous rubber, for example, diene-based rubbers such as styrene-butadiene rubber (SBR), nitrile rubber (NBR), and butyl rubber (IIR) may be used as a rubber component.

As the olefin-based thermoplastic elastomers, for example, "MILASTOMER" (manufactured by Mitsui Chemicals, Inc.), "THERMORUN" (manufactured by Mitsubishi Chemical Corporation), "Sumitomo TPE" (manufactured by Sumitomo Chemical Co., Ltd.), "SANTOPRENE" (manufactured by AES Japan), "DYNARON" (manufactured by JSR Corporation), and the like are commercially available.

Examples of the styrene-based thermoplastic elastomers include a block copolymer or random copolymer comprising an aromatic vinylic polymer block (hard segment) and a conjugated diene-based polymer block (soft segment). Examples of aromatic vinylic compounds include styrene; α-alkylstyrenes such as α-methylstyrene, α-ethylstyrene; and α-methyl-p-methylstyrene, ring alkyl-substituted styrenes, such as o-methylstyrene, m-methylstyrene, p-methylstyrene, 2,4-dimethylstyrene, ethylstyrene, 2,4,6-trimethylstyrene, o-t-butylstyrene, p-t-butylstyrene, and p-cyclohexylstyrene. Examples of the conjugated diene-based compounds include butadiene, isoprene, methylpentadiene, and the like.

Specific examples of the styrene-based thermoplastic elastmers include styrene-butadiene-styrene block copolymers (SBS), styrene-isoprene-styrene block copolymers (SIS), styrene-isobutylene-styrene block copolymers (SIBS), styrene-ethylene/butylene-styrene block copolymers (SEBS), styrene-ethylene/butylene-olefin crystalline block copolymers (SEBC), styrene-ethylene/propylene-styrene block copolymers (SEPS), and the like.

As the styrene-based thermoplastic elastomers, for example, "RABALON" (manufactured by Mitsubishi Chemical Corporation), "Sumitomo TPE-SB" (manufactured by Sumitomo Chemical Co., Ltd.), "SEPTON" (manufactured by Kuraray Co., Ltd.), "HYBRAR" (manufactured by Kuraray Co., Ltd.), and the like are commercially available.

In the invention, (A) the polyolefin-based resin is used preferably, a propylene homopolymer and/or a propylene copolymer, more preferably a propylene homopolymer and a propylene copolymer, and an olefin-based thermoplastic elastomer in combination with the maleic acid-modified polypropylene resin. Herein, the propylene copolymer means the above-mentioned copolymer of propylene with a monomer copolymerizable with propylene.

<(B) Halogen-Based Flame Retardant>

Examples of the halogen-based flame retardant include bromine-based flame retardants and chlorine-based flame retardants. Examples thereof include hexabromobenzene, ethylene bis-dibromonorbornanedicarboxylmide, ethylene bis-tetrabromophthalimide, tetrabromo-bisphenol S, tris(2,3-dibromopropyl-1) isocyanurate, hexabromocyclododecane (HBCD), octabromophenyl ether, tetrabromobisphenol A (TBA) epoxy oligomers or polymers, TBA-bis(2,3-dibromopropyl ether), chlorinated polyolefins, perchlorocyclopentadecane, decabromodiphenyl oxide, polydibromophenylene oxide, bis(tribromophenoxy)ethane, ethylene bis-pentabromobenzene, dibromoethyl-dibromocyclohexane, dibromoneopentyl glycol, tribromophenol, tribromophenol allyl ether, tetradecabromo-diphenoxybenzene, 2,2-bis(4-hydroxy-3,5-dibromophenyl)propane, 2,2-bis(4-hydroxyethoxy-3,5-dibromophenyl)propane, pentabromophenol, pentabromotoluene, pentabromodiphenyl oxide, hexabromodiphenyl ether, octabromodiphenyl ether, octabromodiphenyl oxide, dibromoneopentyl glycol tetracarbonate, bis(tribromophenyl)fumaramide, N-methylhexabromophenylamine, and combinations thereof. As the bromine-based flame retardants, ethylene bis (pentabromophenyl), TBA-bis(2,3-dibromopropyl ether) and ethylene bis-tetrabromophthalimide is preferable. As the chlorine-based flame retardants, chlorinated polyorefins are preferable. Among them, bromine-based flame retardants are preferable, and TBA-bis(2,3-dibromopropyl ether) is most preferable. In addition, by use of a bromine-based flame retardant and antimony dioxide or antimony trioxide in combination, flame retardancy can be satisfied in a smaller mixing amount.

The mixing amount of the halogen-based flame retardant is 10 to 80 parts by weight, preferably 20 to 50 parts by weight, based on 100 parts by weight of the mixture of the polyolefin-based resins. When the mixing amount is less than the above lower limit, flame retardancy is not sufficient, whereas when the amount exceeds the above upper limit, not only improvement of flame retardancy is not observed but also other physical properties, such as abrasion resistance, deteriorate. In addition, an excessive amount of the halogen-based flame retardant can also lead to bleeding-out.

<(C) Metal Hydrate Flame Retardant>

Examples of the metal hydrate flame retardant include compounds having a hydroxyl group or crystal water, such as magnesium hydroxide, aluminum hydroxide, calcium hydroxide, basic magnesium carbonate, hydrated aluminum silicate, and hydrated magnesium silicate and combinations thereof. Among them, magnesium hydroxide and aluminum hydroxide are preferable. Among them, magnesium hydroxide, particularly magnesium hydroxide which is surface-treated with a fatty acid, a silane coupling agent, or the like is more preferable.

Examples of the surface treating agent of magnesium hydroxide include higher fatty acids having at least 10 carbon atoms, such as stearic acid, erucic acid, palmitic acid, lauric acid and behenic acid; an alkali metal salt of the above higher fatty acid; a salt of sulfuric acid ester of higher fatty alcohol such as stearyl alcohol and oleyl alcohol; an anionic surface-active agent such as a salt of sulfuric acid ester of polyethylene glycol ether, a salt of amide-hound sulfuric acid ester, a salt of ester-bound sulfuric acid ester, ester-bound sulfonate, amide-bound sulfonate, ether-bound sulfonate, ether-bound alkyl aryl sulfonate, ester-bound alkyl aryl sulfonate and amide-bound alkyl aryl sulfonate; phosphate esters such as mono- or diester of orthophosphoric acid and oleyl alcohol or stearyl alcohol and a mixture of these mono- and diesters which are acid type, alkali type or amine salts; a silane coupling agent such as vinyl trichlorosilane, vinyl trimethoxysilane, vinyl triethoxysilane, vinyl tris($\beta$-methoxyethoxy)silane, $\beta$-(3,4-epoxycyclohexyl)ethyltrimethoxysilane, $\gamma$-glycidoxypropyltrimethoxysilane, $\gamma$-glycidoxypropylmethyldiethoxysilane, $\gamma$-glycidoxypropyltriethoxysilane, $\gamma$-methacyloxypropylmethyldimethoxysilane, $\gamma$-methacyloxydipropyltrimethoxysilane, $\gamma$-methacyloxypropylmethyldimethoxysilane, $\gamma$-methacyloxypropyltriethyoxysilane, N-$\beta$(aminoethyl)$\gamma$-aminopropylmethyldimethoxysilane, N-$\beta$(aminoethyl)$\gamma$-aminopropyltrimethoxysilane, N-$\beta$(aminoethyl)$\gamma$-aminopropyltriethoxysilane, $\gamma$-aminopropyltrimethoxysilane, $\gamma$-aminopropyltriethoxysilane, N-phenyl-$\gamma$-aminopropyltrimethoxysilane and $\gamma$-mercaptopropyltrimetyoxysilane; titanium containing coupling agent such as isopropyl triisostearoyl titanate, isopropyl tris(dioctylpyrophosphate) titanate, isopropyl tri(N-aminoethyl-aminoethyl) titanate, isopropyl tridecylbenzene sulfonyl titanate, tetraoctylbis(ditridecylphosphite)titanate, bis(dioctylpyro-phosphate)oxyacetate titanate, isopropyltridecylbenzene sulfonyl titanate, tetraisopropylbis(dioctylphosphite) titanate, tetra(2,2-diaryloxymethyl-1-butyl)bis(ditridecyl)phosphate titanate, bis(dioctylpyrophosphate) ethylene titanate, isopropyltrioctanoyl titanate, isopropyldimethacryl isostearoyl titanate, isopropyl isostearyl diacryl titanate, isopropyl tri(dioctylphosphato) titanate, isopropyl tricumyl phenyl titanate, dicumylphenyloxyacetate titanate, and diisostearoyl ethylene titanate; aluminium containing coupling agent such as acetoalcoxy aluminum diisopropylate; ester of multivalent alcohol and fatty acid such as triphenyl phosphite, diphenyl tridecyl phosphite, phenyl tridecyl phosphite, phenyl ditridecyl phosphite, phenyl isodecyl phosphite, tri nonyl phenyl phosphite, 4,4'-butylidene-bis(3-methyl-6-t-butylphenyl ditridecyl)phosphite, trilauryl thin phosphite, glyceryl monostearate, and glyceryl monooleate.

The mixing amount of the metal hydrate flame retardant is 5 to 45 parts by weight, preferably 20 to 30 parts by weight, based on 100 parts by weight of the mixture of the polyolefin-based resins. When the mixing amount is less than the above lower limit, flame retardancy is insufficient, whereas when the amount exceeds the above upper limit, battery fluid resistance tends to deteriorate.

In addition to the above (A) to (C) components, conventional additives such as antioxidants, agents for weather resistance, stabilizers, fillers, lubricants, crosslinking agents, plasticizers, and dispersion accelerators can be added into the composition to be used in the invention in such an amount that the purpose of the invention is not inhibited.

The above composition can be produced by melt-mixing the above individual components and, if necessary, various additives according to usual methods. As mixing methods, equipments capable of compounding, such as an extruder, Henschel mixer, a kneader, a screw kneader, Banbury mixer, and a roll mill can be used. By coating a conductor with the resulting composition using an extruder or the like according to usual methods, an electric wire can be obtained.

The invention will be described in detail but the invention should not be construed as being limited thereto.

EXAMPLES 1 to 75

Comparative Examples 1 to 65

Compositions of Examples and compositions of Comparative Examples were prepared by kneading individual components in mixing amounts (parts by weight) shown in odd numbered Tables and even numbered Tables, respectively, in a kneader or a screw kneader. Using the compositions, electric wires for an automobile were produced. Details of individual components in Tables are as follows.

Polyolefin-based resin 1: a propylene homopolymer (PS201A, manufactured by SunAllomer Ltd.)

Polyolefin-based resin 2: a propylene copolymer (PM870A, manufactured by SunAllomer Ltd.)

Olefin-based thermoplastic elastomer: Q100f (manufactured by SunAllomer Ltd.)

Styrene-based thermoplastic elastomer: a styrene-ethylene/butylene-styrene block copolymer (TUFTEC H1062, manufactured by Asahi Kasei Chemicals Corporation)

Maleic acid-modified polypropylene (U-mex 1001, manufactured by Sanyo Chemical Industries, Ltd.)

Halogen-based flame retardant: a bromine-based flame retardant (FLAMECUT 121K, manufactured by Tosoh Corporation)

Metal hydrate flame retardant: magnesium hydroxide (KISUMA 5A, manufactured by Kyowa Chemical Industry Co., Ltd.)

Each of the resulting resin composition was charged into an extruder (diameter: 60 mm, L/D=24.5, FF screw) and extruded on a conductor having a conductor area 0.3395 mm$^2$ (strand constitution: 0.2485 mm×7 strands, twisted) at an extrusion rate of 600 mm/minute and an extrusion temperature of 230° C., thereby producing an insulated coated electric wire having a finished outer diameter of 1.20 mm.

The following evaluation was performed for the electric wires obtained.

(1) Coating Strippability

Using a processing machine having a flat-blade knife, it was confirmed whether a coating stripping operation of the electric wires was easy or not, that is, whether the coating resin was clearly cut without failure in tearing due to elongation of the coating resin or not. The case where the wire was clearly cut was evaluated as "A" and the case where the wire was not clearly cut was evaluated as "B".

(2) Battery Fluid Resistance

A test was performed in accordance with ISO6722. A battery fluid ($H_2SO_4$ solution) having a specific gravity of 1.260±0.005 was poured on the insulation coated electric wires dropwise so that the drops did not come into contact with each other. Then, the insulated coated electric wires were kept in an oven at 90° C. for 8 hours. Thereafter, they were taken out and then drops of the battery fluid were again sprinkled as above. Then, the wires were kept in the oven at 90° C. for 16 hours. These operations constituted one cycle. After two cycles were repeated in total, the resulting wires were allowed to stand at room temperature (23° C.±5° C.) for 30 minutes. Then, each of the electric wires was wound on a prescribed mandrel and the insulated coated part of the wound electric wire was visually observed. For the wires on which no exposure of the conductor was observed, a withstand voltage test was performed. The wires on which no conduction discontinuance was observed were evaluated as pass ("A"). The wires on which exposure of the conductor was observed or conduction discontinuance was observed were evaluated as "B".

(3) Flame Retardancy

A test was performed in accordance with ISO6722. A sample of the electric wire having a length of 600 mm or more was placed in a calm tank at an incline of 45°. After reducing flame of a Bunsen burner was applied to a portion 500 mm±5 mm apart from the upper end for 5 seconds, the sample which put out the flame within 70 seconds was evaluated as pass ("A") and the sample which did not put out the flame within 70 seconds was evaluated as "B".

TABLE 1

| | Component | Example 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| (A) | Polyolefin-based resin | 99 | 99 | 99 | 99 | 99 | 99 | 99 | 99 | 99 | 70 | 70 | 70 | 70 | 70 | 70 |
| | Olefin-based thermoplastic elastomer | 0 | 0 | 0 | 0 | 0 | 0 | 0 | 0 | 0 | 0 | 0 | 0 | 0 | 0 | 0 |
| | Styrene-based thermoplastic elastomer | 0 | 0 | 0 | 0 | 0 | 0 | 0 | 0 | 0 | 0 | 0 | 0 | 0 | 0 | 0 |
| | Maleic acid-modified polypropylene resin | 1 | 1 | 1 | 1 | 1 | 1 | 1 | 1 | 1 | 30 | 30 | 30 | 30 | 30 | 30 |
| (B) | Halogen-based flame retardant | 10 | 30 | 50 | 80 | 10 | 50 | 10 | 50 | 80 | 10 | 80 | 10 | 80 | 10 | 80 |
| (C) | Metal hydrate flame retardant | 5 | 5 | 5 | 5 | 30 | 30 | 45 | 45 | 45 | 5 | 5 | 20 | 20 | 45 | 45 |
| Evaluation | Coating strippability | A | A | A | A | A | A | A | A | A | A | A | A | A | A | A |
| | Battery fluid resistance | A | A | A | A | A | A | A | A | A | A | A | A | A | A | A |
| | Flame retardancy | A | A | A | A | A | A | A | A | A | A | A | A | A | A | A |

TABLE 2

| | Component | Comparative Example 1 | 2 | 3 | 4 | 5 | 6 | 7 | 8 | 9 | 10 | 11 | 12 | 13 |
|---|---|---|---|---|---|---|---|---|---|---|---|---|---|---|
| (A) | Polyolefin-based resin | 100 | 100 | 100 | 100 | 65 | 65 | 65 | 65 | 90 | 90 | 90 | 90 | 90 |
| | Olefin-based thermoplastic elastomer | 0 | 0 | 0 | 0 | 0 | 0 | 0 | 0 | 0 | 0 | 0 | 0 | 0 |
| | Styrene-based thermoplastic elastomer | 0 | 0 | 0 | 0 | 0 | 0 | 0 | 0 | 0 | 0 | 0 | 0 | 0 |
| | Maleic acid-modified polypropylene resin | 0 | 0 | 0 | 0 | 35 | 35 | 35 | 35 | 10 | 10 | 10 | 10 | 10 |
| (B) | Halogen-based flame retardant | 10 | 10 | 80 | 80 | 10 | 10 | 80 | 80 | 0 | 0 | 0 | 10 | 10 |
| (C) | Metal hydrate flame retardant | 5 | 45 | 5 | 45 | 5 | 45 | 5 | 45 | 5 | 45 | 50 | 0 | 50 |
| Evaluation | Coating strippability | B | B | B | B | B | B | B | B | A | A | A | B | A |
| | Battery fluid resistance | A | A | A | A | A | A | A | A | A | A | B | A | B |
| | Flame retardancy | A | A | A | A | B | A | A | A | B | B | B | B | A |

TABLE 3

| | Component | Example 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|
| (A) | Polyolefin-based resin | 79 | 79 | 79 | 79 | 79 | 79 | 79 | 79 | 79 | 50 | 50 | 50 | 50 | 50 | 50 |
| | Olefin-based thermoplastic elastomer | 20 | 20 | 20 | 20 | 20 | 20 | 20 | 20 | 20 | 20 | 20 | 20 | 20 | 20 | 20 |
| | Styrene-based thermoplastic elastomer | 0 | 0 | 0 | 0 | 0 | 0 | 0 | 0 | 0 | 0 | 0 | 0 | 0 | 0 | 0 |
| | Maleic acid-modified polypropylene resin | 1 | 1 | 1 | 1 | 1 | 1 | 1 | 1 | 1 | 30 | 30 | 30 | 30 | 30 | 30 |
| (B) | Halogen-based flame retardant | 10 | 30 | 50 | 80 | 10 | 50 | 10 | 50 | 80 | 10 | 80 | 10 | 80 | 10 | 80 |
| (C) | Metal hydrate flame retardant | 5 | 5 | 5 | 5 | 30 | 30 | 45 | 45 | 45 | 5 | 5 | 20 | 20 | 45 | 45 |
| Evaluation | Coating strippability | A | A | A | A | A | A | A | A | A | A | A | A | A | A | A |
| | Battery fluid resistance | A | A | A | A | A | A | A | A | A | A | A | A | A | A | A |
| | Flame retardancy | A | A | A | A | A | A | A | A | A | A | A | A | A | A | A |

TABLE 4

| | Component | Comparative Example | | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 | 26 |
| (A) | Polyolefin-based resin | 80 | 80 | 80 | 80 | 45 | 45 | 45 | 45 | 70 | 70 | 70 | 70 | 70 |
| | Olefin-based thermoplastic elastomer | 20 | 20 | 20 | 20 | 20 | 20 | 20 | 20 | 20 | 20 | 20 | 20 | 20 |
| | Styrene-based thermoplastic elastomer | 0 | 0 | 0 | 0 | 0 | 0 | 0 | 0 | 0 | 0 | 0 | 0 | 0 |
| | Maleic acid-modified polypropylene resin | 0 | 0 | 0 | 0 | 35 | 35 | 35 | 35 | 10 | 10 | 10 | 10 | 10 |
| (B) | Halogen-based flame retardant | 10 | 10 | 80 | 80 | 10 | 10 | 80 | 80 | 0 | 0 | 0 | 10 | 10 |
| (C) | Metal hydrate flame retardant | 5 | 45 | 5 | 45 | 5 | 45 | 5 | 45 | 5 | 45 | 50 | 0 | 50 |
| Evaluation | Coating strippability | B | B | B | B | B | B | B | B | A | A | A | B | A |
| | Battery fluid resistance | A | A | A | A | A | A | A | A | A | B | A | A | B |
| | Flame retardancy | A | A | A | A | B | A | A | A | B | B | B | A | A |

TABLE 5

| | Component | Example | | | | | | | | | | | | | | |
|---|---|---|---|---|---|---|---|---|---|---|---|---|---|---|---|---|
| | | 31 | 32 | 33 | 34 | 35 | 36 | 37 | 38 | 39 | 40 | 41 | 42 | 43 | 44 | 45 |
| (A) | Polyolefin-based resin | 79 | 79 | 79 | 79 | 79 | 79 | 79 | 79 | 79 | 50 | 50 | 50 | 50 | 50 | 50 |
| | Olefin-based thermoplastic elastomer | 10 | 10 | 10 | 10 | 10 | 10 | 10 | 10 | 10 | 10 | 10 | 10 | 10 | 10 | 10 |
| | Styrene-based thermoplastic elastomer | 10 | 10 | 10 | 10 | 10 | 10 | 10 | 10 | 10 | 10 | 10 | 10 | 10 | 10 | 10 |
| | Maleic acid-modified polypropylene resin | 1 | 1 | 1 | 1 | 1 | 1 | 1 | 1 | 1 | 30 | 30 | 30 | 30 | 30 | 30 |
| (B) | Halogen-based flame retardant | 10 | 30 | 50 | 80 | 10 | 50 | 10 | 50 | 80 | 10 | 80 | 10 | 80 | 10 | 80 |
| (C) | Metal hydrate flame retardant | 5 | 5 | 5 | 5 | 30 | 30 | 45 | 45 | 45 | 5 | 5 | 20 | 20 | 45 | 45 |
| Evaluation | Coating strippability | A | A | A | A | A | A | A | A | A | A | A | A | A | A | A |
| | Battery fluid resistance | A | A | A | A | A | A | A | A | A | A | A | A | A | A | A |
| | Flame retardancy | A | A | A | A | A | A | A | A | A | A | A | A | A | A | A |

TABLE 6

| | Component | Comparative Example | | | | | | | | | | | | |
|---|---|---|---|---|---|---|---|---|---|---|---|---|---|
| | | 27 | 28 | 29 | 30 | 31 | 32 | 33 | 34 | 35 | 36 | 37 | 38 | 39 |
| (A) | Polyolefin-based resin | 80 | 80 | 80 | 80 | 45 | 45 | 45 | 45 | 70 | 70 | 70 | 70 | 70 |
| | Olefin-based thermoplastic elastomer | 10 | 10 | 10 | 10 | 10 | 10 | 10 | 10 | 10 | 10 | 10 | 10 | 10 |
| | Styrene-based thermoplastic elastomer | 10 | 10 | 10 | 10 | 10 | 10 | 10 | 10 | 10 | 10 | 10 | 10 | 10 |
| | Maleic acid-modified polypropylene resin | 0 | 0 | 0 | 0 | 35 | 35 | 35 | 35 | 10 | 10 | 10 | 10 | 10 |
| (B) | Halogen-based flame retardant | 10 | 10 | 80 | 80 | 10 | 10 | 80 | 80 | 0 | 0 | 0 | 10 | 10 |
| (C) | Metal hydrate flame retardant | 5 | 45 | 5 | 45 | 5 | 45 | 5 | 45 | 5 | 45 | 50 | 0 | 50 |
| Evaluation | Coating strippability | B | B | B | B | B | B | B | B | A | A | A | B | A |
| | Battery fluid resistance | A | A | A | A | A | A | A | A | A | B | A | B | |
| | Flame retardancy | A | A | A | A | B | A | A | A | B | B | B | A | A |

TABLE 7

| | Component | Example | | | | | | | | | | | | | | |
|---|---|---|---|---|---|---|---|---|---|---|---|---|---|---|---|---|
| | | 46 | 47 | 48 | 49 | 50 | 51 | 52 | 53 | 54 | 55 | 56 | 57 | 58 | 59 | 60 |
| (A) | Polyolefin-based resin | 79 | 79 | 79 | 79 | 79 | 79 | 79 | 79 | 79 | 50 | 50 | 50 | 50 | 50 | 50 |
| | Olefin-based thermoplastic elastomer | 0 | 0 | 0 | 0 | 0 | 0 | 0 | 0 | 0 | 0 | 0 | 0 | 0 | 0 | 0 |
| | Styrene-based thermoplastic elastomer | 20 | 20 | 20 | 20 | 20 | 20 | 20 | 20 | 20 | 20 | 20 | 20 | 20 | 20 | 20 |
| | Maleic acid-modified polypropylene resin | 1 | 1 | 1 | 1 | 1 | 1 | 1 | 1 | 1 | 30 | 30 | 30 | 30 | 30 | 30 |
| (B) | Halogen-based flame retardant | 10 | 30 | 50 | 80 | 10 | 50 | 10 | 50 | 80 | 10 | 80 | 10 | 80 | 10 | 80 |
| (C) | Metal hydrate flame retardant | 5 | 5 | 5 | 5 | 30 | 30 | 45 | 45 | 45 | 5 | 5 | 20 | 20 | 45 | 45 |
| Evaluation | Coating strippability | A | A | A | A | A | A | A | A | A | A | A | A | A | A | A |
| | Battery fluid resistance | A | A | A | A | A | A | A | A | A | A | A | A | A | A | A |
| | Flame retardancy | A | A | A | A | A | A | A | A | A | A | A | A | A | A | A |

TABLE 8

| | Component | Comparative Example | | | | | | | | | | | | |
|---|---|---|---|---|---|---|---|---|---|---|---|---|---|
| | | 40 | 41 | 42 | 43 | 44 | 45 | 46 | 47 | 48 | 49 | 50 | 51 | 52 |
| (A) | Polyolefin-based resin | 80 | 80 | 80 | 80 | 45 | 45 | 45 | 45 | 70 | 70 | 70 | 70 | 70 |
| | Olefin-based thermoplastic elastomer | 0 | 0 | 0 | 0 | 0 | 0 | 0 | 0 | 0 | 0 | 0 | 0 | 0 |
| | Styrene-based thermoplastic elastomer | 20 | 20 | 20 | 20 | 20 | 20 | 20 | 20 | 20 | 20 | 20 | 20 | 20 |
| | Maleic acid-modified polypropylene resin | 0 | 0 | 0 | 0 | 35 | 35 | 35 | 35 | 10 | 10 | 10 | 10 | 10 |
| (B) | Halogen-based flame retardant | 10 | 10 | 80 | 80 | 10 | 10 | 80 | 80 | 0 | 0 | 0 | 10 | 10 |
| (C) | Metal hydrate flame retardant | 5 | 45 | 5 | 45 | 5 | 45 | 5 | 45 | 5 | 45 | 50 | 0 | 50 |
| Evaluation | Coating strippability | B | B | B | B | B | B | B | B | A | A | A | B | A |
| | Battery fluid resistance | A | A | A | A | A | A | A | A | A | B | A | A | B |
| | Flame retardancy | A | A | A | A | B | A | A | A | B | B | B | A | A |

TABLE 9

| | Component | Example | | | | | | | | | | | | | | |
|---|---|---|---|---|---|---|---|---|---|---|---|---|---|---|---|
| | | 61 | 62 | 63 | 64 | 65 | 66 | 67 | 68 | 69 | 70 | 71 | 72 | 73 | 74 | 75 |
| (A) | Polyolefin-based resin 1 | 69 | 69 | 69 | 69 | 69 | 69 | 69 | 69 | 69 | 40 | 40 | 40 | 40 | 40 | 40 |
| | Polyolefin-based resin 2 | 10 | 10 | 10 | 10 | 10 | 10 | 10 | 10 | 10 | 10 | 10 | 10 | 10 | 10 | 10 |
| | Olefin-based thermoplastic elastomer | 10 | 10 | 10 | 10 | 10 | 10 | 10 | 10 | 10 | 10 | 10 | 10 | 10 | 10 | 10 |
| | Styrene-based thermoplastic elastomer | 10 | 10 | 10 | 10 | 10 | 10 | 10 | 10 | 10 | 10 | 10 | 10 | 10 | 10 | 10 |
| | Maleic acid-modified polypropylene resin | 1 | 1 | 1 | 1 | 1 | 1 | 1 | 1 | 1 | 30 | 30 | 30 | 30 | 30 | 30 |
| (B) | Halogen-based flame retardant | 10 | 30 | 50 | 80 | 10 | 50 | 10 | 50 | 80 | 10 | 80 | 10 | 80 | 10 | 80 |
| (C) | Metal hydrate flame retardant | 5 | 5 | 5 | 5 | 30 | 30 | 45 | 45 | 45 | 5 | 5 | 20 | 20 | 45 | 45 |
| Evaluation | Coating strippability | A | A | A | A | A | A | A | A | A | A | A | A | A | A | A |
| | Battery fluid resistance | A | A | A | A | A | A | A | A | A | A | A | A | A | A | A |
| | Flame retardancy | A | A | A | A | A | A | A | A | A | A | A | A | A | A | A |

TABLE 10

| | Component | Comparative Example | | | | | | | | | | | | |
|---|---|---|---|---|---|---|---|---|---|---|---|---|---|
| | | 53 | 54 | 55 | 56 | 57 | 58 | 59 | 60 | 61 | 62 | 63 | 64 | 65 |
| (A) | Polyolefin-based resin 1 | 70 | 70 | 70 | 70 | 35 | 35 | 35 | 35 | 60 | 60 | 60 | 60 | 60 |
| | Polyolefin-based resin 2 | 10 | 10 | 10 | 10 | 10 | 10 | 10 | 10 | 10 | 10 | 10 | 10 | 10 |
| | Olefin-based thermoplastic elastomer | 10 | 10 | 10 | 10 | 10 | 10 | 10 | 10 | 10 | 10 | 10 | 10 | 10 |
| | Styrene-based thermoplastic elastomer | 10 | 10 | 10 | 10 | 10 | 10 | 10 | 10 | 10 | 10 | 10 | 10 | 10 |
| | Maleic acid-modified polypropylene resin | 0 | 0 | 0 | 0 | 35 | 35 | 35 | 35 | 10 | 10 | 10 | 10 | 10 |
| (B) | Halogen-based flame retardant | 10 | 10 | 80 | 80 | 10 | 10 | 80 | 80 | 0 | 0 | 0 | 10 | 10 |
| (C) | Metal hydrate flame retardant | 5 | 45 | 5 | 45 | 5 | 45 | 5 | 45 | 5 | 45 | 50 | 0 | 50 |
| Evaluation | Coating strippability | B | B | B | B | B | B | B | B | A | A | A | B | A |
| | Battery fluid resistance | A | A | A | A | A | A | A | A | A | B | A | A | B |
| | Flame retardancy | A | A | A | A | B | A | A | A | B | B | B | A | A |

As shown in the above individual Tables, all electric wires of Comparative Examples where the amount of the maleic acid-modified polypropylene resin was out of the range of the invention were poor in coating strippability. Moreover, those containing a large amount of the metal hydrate flame retardant (Comparative Example 13 and the like) were poor in battery fluid resistance. Contrarily, the electric wires of Examples were excellent in all the properties.

While the invention has been described in detail and with reference to specific embodiments thereof, it will be apparent to one skill in the art that various changes and modifications can be made therein without departing from the spirit and scope thereof.

The electric wire for an automobile of the invention is suitable for mounting on a battery portion and surroundings thereof.

What is claimed is:

1. An electric wire for an automobile, coated with a composition comprising (A) 100 parts by weight of a mixture of 1 to 30 parts by weight of a maleic acid-modified polypropylene resin and a polyolefin-based resin other than the maleic acid-modified polypropylene resin, (B) 10 to 80 parts by weight of a halogen-based flame retardant, and (C) 5 to 45 parts by weight of a metal hydrate flame retardant.

2. The electric wire according claim 1, wherein a mixing amount of the maleic acid-modified polypropylene resin is 5 to 10 parts by weight.

3. The electric wire according claim 1, wherein the polyolefin-based resin other than the maleic acid-modified polypropylene resin is at least one compound selected from a polypropylene-based resin other than the maleic acid-modified polypropylene-based resin, an olefin-based thermoplastic elastomer, and a styrene-based thermoplastic elastomer.

4. The electric wire according claim 3, wherein the polypropylene-based resin other than the maleic acid-modified polypropylene-based resin is at least one compound selected from a polypropylene homopolymer and a copolymer of propylene with a monomer copolymerizable with propylene.

5. The electric wire according claim 1, wherein a mixing amount of the halogen-based flame retardant is 20 to 50 parts by weight.

6. The electric wire according claim 1, wherein a mixing amount of the metal hydrate flame retardant is 20 to 30 parts by weight.

* * * * *